Nov. 18, 1941.  A. H. R. FEDDEN  2,263,124
BUILT-UP CRANKSHAFT
Filed May 13, 1940  3 Sheets-Sheet 1
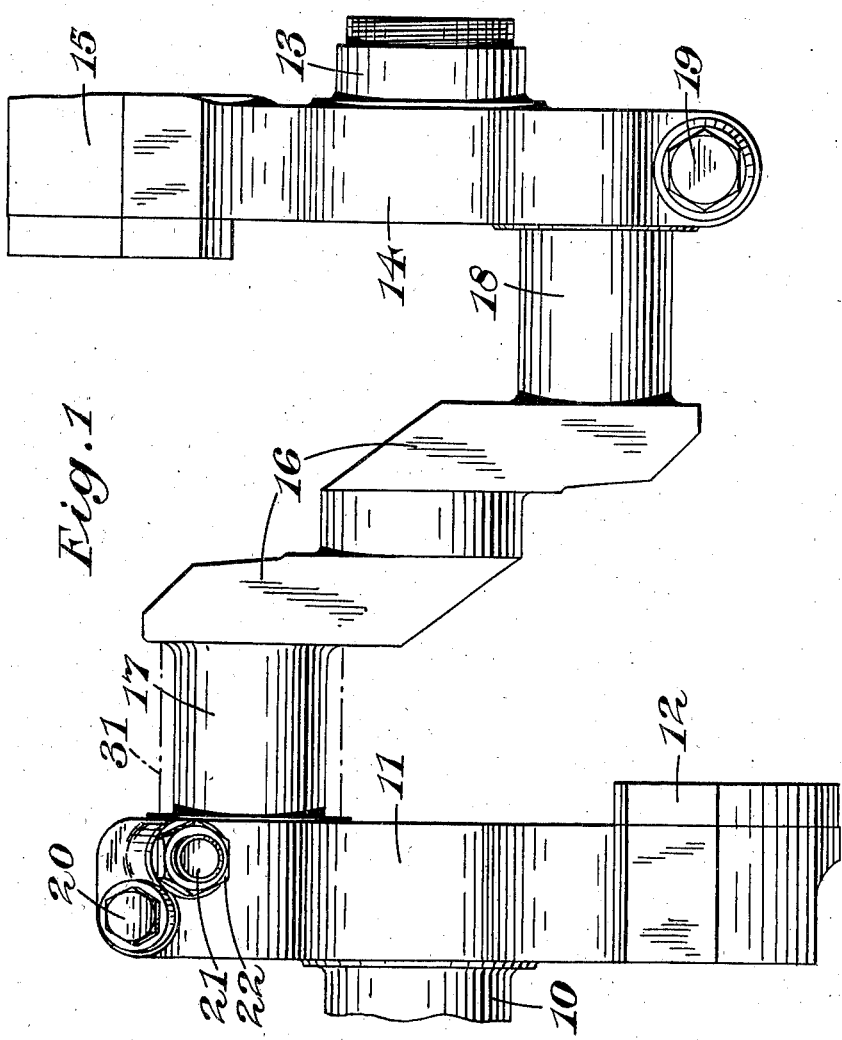
Inventor
Alfred H. R. Fedden
by Wilkinson & Mawhinney
Attorneys.

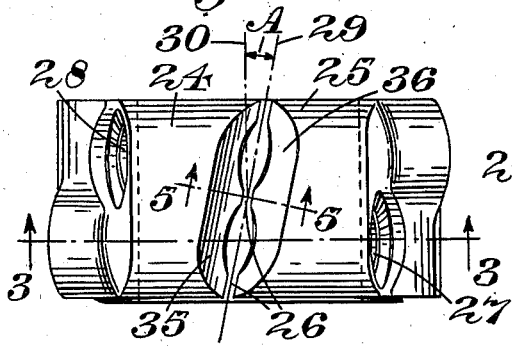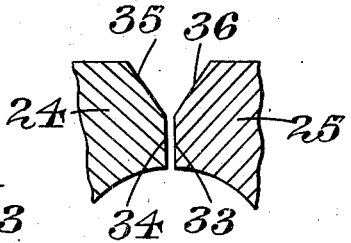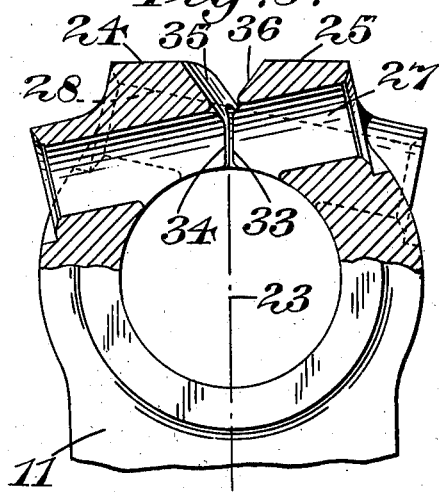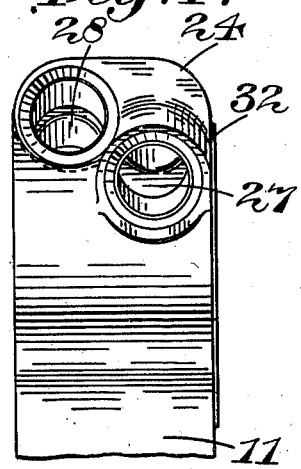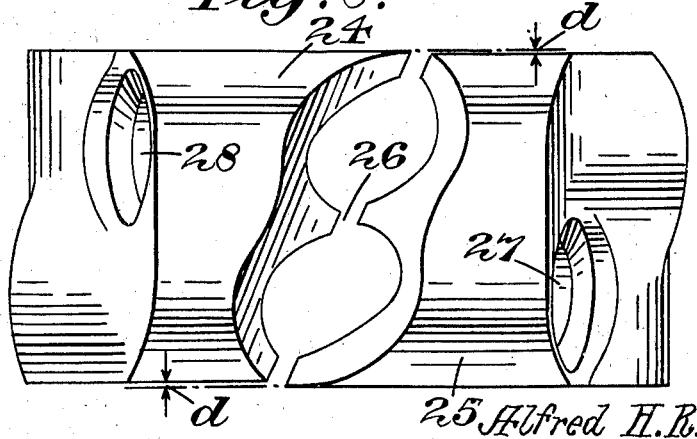

Nov. 18, 1941.  A. H. R. FEDDEN  2,263,124
BUILT-UP CRANKSHAFT
Filed May 13, 1940  3 Sheets-Sheet 3
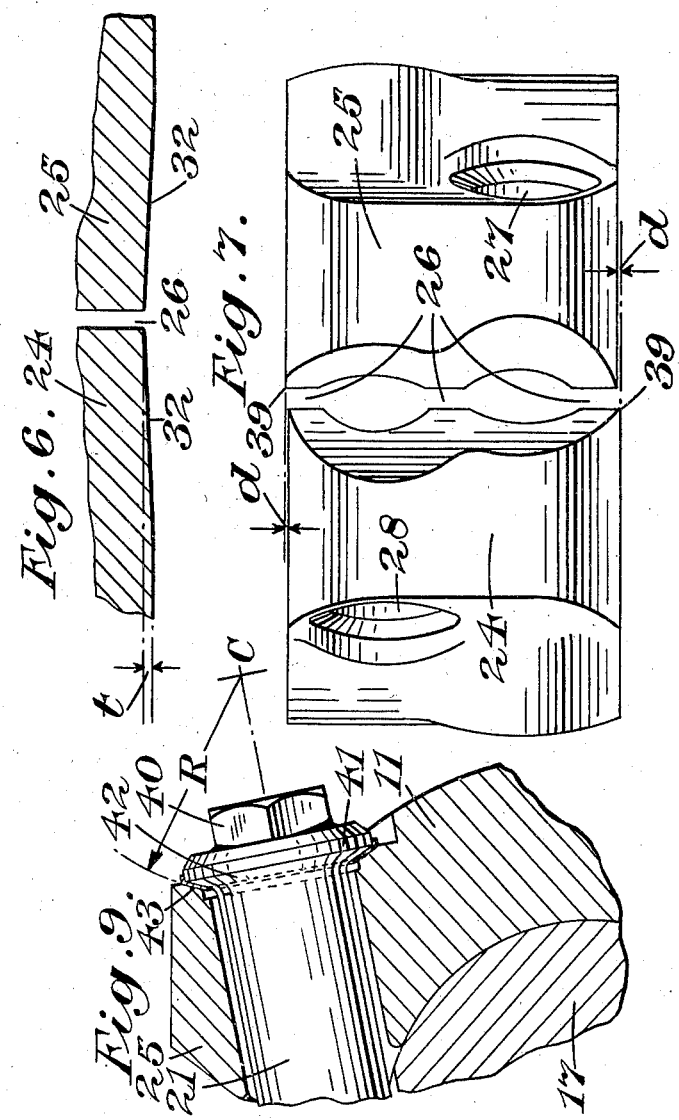
Inventor
Alfred H. R. Fedden
by Wilkinson & Mawhinney
Attorneys.

Patented Nov. 18, 1941

2,263,124

UNITED STATES PATENT OFFICE 2,263,124

BUILT-UP CRANKSHAFT

Alfred Hubert Roy Fedden, Bristol, England, assignor to The Bristol Aeroplane Company Limited, Bristol, England, a British company Application May 13, 1940, Serial No. 334,993
In Great Britain June 17, 1939

4 Claims. (Cl. 287—20)

This invention relates to built-up crankshafts for internal-combustion engines and has for its object to provide an improved joint, between the crank-web and the crank-pin, of the type in which the crank-web is slit to form two parts (herein termed the "horns") which are clamped into tight engagement with the crank-pin.

Hitherto the web-slit by which the horns are separated has been disposed parallel with the axis of the crank-pin. But we have found that certain types of joint, (an example of which is described below) where the slit is disposed in this way, have the disadvantage that one or both of the horns becomes deflected or distorted in the neighbourhood of the slit in a direction lengthwise of the crank-pin axis when the clamping means is tightened. Such distortion may be undesirable for many reasons but, in particular, where the horns distort unequally or in opposite senses (as in the example described below) an abrupt ledge or step is formed on the inside face of the web; such step cuts the end-face of the usual crank-pin bush. The object of the invention is to prevent the formation of such a ledge or step or to reduce its size.

According to the invention, in a joint of the kind described, between a crank-pin and crank-web, in which deflection or distortion of the horns endwise of the crank-pin axis tends to occur where the slit is parallel with the crank-pin axis, the said slit is skewed with respect to the said axis in such sense and by such an extent as to reduce the said deflection or distortion.

The invention is primarily concerned with a joint in which the horns are clamped around the crank-pin by means of two bolts of which the axes are spaced apart lengthwise of the crank-pin axis. For reasons of assembly and compactness the bolt-axes, though lying in parallel planes, are not parallel with one another but are disposed obliquely with respect to the plane containing both the crankshaft and the crank-pin axes, the two bolt-axes being inclined oppositely to this plane. It is found that each of the horns of such a joint, when separated by a slit parallel with the crank-pin axis, distorts in a direction towards the inner bolt; that is to say, the bolt which, in passing through that horn, is nearer to the crank-pin axis. According to the invention, the slit is skewed with respect to the crank-shaft axis towards the inner end of each bolt-hole; that is to say, the extent of each horn peripherally of the crank-pin is increased at the neighbourhood of the outer bolt and decreased at the neighbourhood of the inner bolt.

Such skewing of the slit is found to reduce the distortion above referred to. But it may not always be possible to select an angle for the slit, in relation to a given design of joint, such that every joint made to that design is free from distortion. According to a further feature of the invention, the face of the crank-web adjacent the crank-pin bush may therefore be relieved in the neighbourhood of the slit whereby such step or ledge as may be formed is prevented from making contact with the crank-pin bush.

A specific embodiment of the invention will now be described, by way of example, with reference to the accompanying drawings of which—

Figure 1 is a general view of a two-throw crankshaft incorporating a maneton joint according to the invention, Figure 2 is a plan of the joint, Figure 3 is a section on the line 3—3 of Figure 2, Figure 4 is a side elevation of the joint, the bolts being omitted from Figures 2, 3 and 4, Figure 5 is a section on the line 5—5 of Figure 2, Figure 6 is a developed plan of part of the face of the crank-web showing the manner in which the metal is relieved in the neighbourhood of the slit, Figures 7 and 8 are diagrams illustrating the distortion referred to, and Figure 9 is an enlargement of part of Figure 3 showing a bolt and the crank-pin in position.

As shown in Figure 1, a crankshaft for a two-throw radial-cylinder internal-combustion engine comprises a front maneton composed of a shaft 10, formed integrally with a crank-web 11 and balance-weight 12; a rear maneton composed of a shaft 13, a crank-web 14, and balance-weight 15; and a central portion composed of a double crank-web 16 having integrally formed with it a crank-pin 17 to engage the web 11 and a crank-pin 18 to engage the web 14.

The joint between the crank-pin 18 and the rear maneton may be made by means of a single bolt 19 since the torque at this end is comparatively small. The torque between the front maneton and the crank-pin 17 is, however, much greater since the greater part of the power is transmitted through the shaft 10. The invention therefore provides, at the front end, a double-bolt joint of which the two bolts 20 and 21 are shown in Figure 1. The bolts are oppositely directed so that Figure 1 shows the head of the bolt 20 and the nut 22 engaging the bolt 21. The head of the bolt 21 is shown in Figure 9.

In order to enable bolts of large diameter to be used in the limited width of the crank-web, the bolt-axes are inclined to one another as shown in Figure 3 in the manner already described, the axes making equal and opposite angles with a plane 23 containing both the axis of the crank-pin 17 and the axis of the crank-shaft 10, 13. The end of the web which engages the crank-pin 17 is slit to form two horns 24, 25, and the known method of cutting the slit is illustrated in Figure 7, which is a diagrammatic plan, in which it will be seen that the slit 26 runs perpendicularly from one face of the web to the other; that is to say, it lies parallel with the axis of the crank-pin 17. However, it is found that if the slit is disposed parallel with the crank-pin axis, as shown in Figure 7, the unequal moduli at different parts of the two horns in the neighbourhood of the slit causes each horn to be distorted when the nuts are tightened up, each horn being displaced in a direction longitudinally of the crank-pin axis towards the inner bolt. That is to say, as shown in Figure 7, the horn 24 deflects in the direction of the hole 27 of the bolt 21 which bolt, in passing through that horn, is at a smaller radial distance from the crank-pin axis than the other bolt. Similarly, the horn 25 deflects in the direction of the hole 28 through which the bolt 20 passes; this bolt, in passing through the horn 25, being at a smaller radial distance from the crank-pin axis than the bolt 21. The extent of such distortion, that is to say, the dimension $d$ in Figure 7, may amount to .006" in a crank-web about 2½" wide and having a crank-pin bore of about 3".

The reason for this distortion may be understood by considering cross-sections of the horns made by planes containing the crank-pin axis. It is clear that the horn 25, for example, is stiffer at the region of the hole 28, since there is more metal radially beyond the hole, than at the region of the hole 27. The consequence of such difference of stiffness between one side of the horn and the other is that when the nuts of the bolts 20 and 21 are tightened up the lateral distortion of Figure 7 occurs, producing a step 39 between one side of the slit 26 and the other.

According to the invention, the above distortion is eliminated or reduced by the expedient of cutting the slit 26 skew-wise as shown in Figure 2 in which the axis 29 of the slit 26 is shown inclined to the crank-pin axis 30 at an angle A in the direction of the inner end of each bolt-hole. In the particular example described, the angle A may be about 11°. The effect of skewing the slit is that the stiffness of the stiffer portion of each horn is reduced and the stiffness of the weaker portion is increased. That is to say, the part of the horn 25 in the neighbourhood of the hole 28 is cut away whereby its peripheral dimension is reduced, and the part of the horn in the neighbourhood of the hole 27 has the amount of metal in it increased. The angle A is so chosen as to reduce the amount of distortion $d$ to a minimum.

The design of maneton joints is controlled by a number of considerations, so that the proportions in different designs may vary considerably; it is, therefore, impossible to specify, in general, the limits within which the value of the angle A must lie but may be stated that an undue increase in this value will give no benefit over the parallel arrangement of the slit shown in Figure 7. For example, should the angle A be increased to about 22° as shown in Figure 8, the relative stiffness of the two parts of each horn is reversed so that the distortion $d$ occurs as before but in the opposite sense in each case.

In manufacturing a number of articles from a given design, discrepancies inevitably occur, resulting in a slight variation in the dimensions of the finished products; slight variations also occur in the elasticity of the materials. It follows that, when a number of joints are manufactured from a given design, the angle A may not in all cases be exactly that which is required to ensure that the joint shall be free from distortion. According to the invention, therefore, the face of the crank-web which abuts against the crank-pin bush 31 (Figure 1) is relieved as shown in Figure 6 by being formed with tapering portions 32 at either side of the slit 26. The tapering may take place over an arc of about 1½" on each horn and the extent $t$ by which the face is relieved may be about .005 inch. Thus, any slight step which may occur is prevented from making contact with the bush 31.

The resistance of the horns to the distortion above referred to may be further increased by reinforcing the horns in the neighbourhood of the slit. For example, as shown in Figures 3 and 5, the adjacent faces 35, 34, of the horns 25, 24, which bound the slit 26, may be arranged close together (for example, ⅛" apart) and may run parallel with one another for the greater part of the area in the neighbourhood of the bolt-holes. The region radially beyond the bolt-holes, however, makes no useful contribution to the strength of the joint and is therefore cut away as shown at 35 and 36 which two faces may make an angle of 70° with one another.

The strength of the joint may be further increased by providing spherical interengaging surfaces between the bolts and the horns and/or between the nuts and the horns. For example, as shown in Figure 9, the head 40 of the bolt 21 is formed with a boss 41 of which the inner annular face 42 is machined to a spherical shape about a radius R, the centre C being disposed on the bolt axis. The co-operating annular face of the crank-web 11 is machined to the same shape and the two spherical faces are separated by a thin steel washer 43 which is domed to conform to the shape of the spherical faces on either side of it. Similar provision is made for the head of the bolt 20 and/or for each of the nuts. The distribution of pressure over the engaging surfaces thus remains uniform as the nuts are tightened up and the bolts are thus relieved of bending loads.

I claim:

1. A joint between a crank-pin and a crank-web which is slitted to form two horns comprising two bolts passing through holes in the horns to clamp them to the crank-pin, wherein the bolts are equally and oppositely inclined with respect to the plane containing both the crank-pin and the crankshaft axes and wherein the said slit is skewed to lie in a plane angularly related to the plane of the pin axis.

2. A joint between a crank-pin and a crank-web which is slitted to form two horns comprising two bolts passing through the horns to clamp them to the crank-pin, wherein the bolts are equally and oppositely inclined with respect to the plane containing both the crank-pin and the crankshaft axes, and wherein the face of the crank-web adjacent the crank-pin is relieved in the neighbourhood of the slit.

3. A joint between a crank-pin and a crank-web which is slitted to form two horns comprising two bolts passing through the horns to clamp them to the crank-pin, wherein the bolts are equally and oppositely inclined with respect to the plane containing both the crank-pin and the crankshaft axes, and wherein the slit is bounded, for a substantial part of the area in the neighbourhood of the bolts, by closely spaced parallel walls of the horns.

4. A joint between a crank-pin and a crank-web which is slitted to form two horns, comprising non-parallel bolts passing through the horns to clamp them to the crank-pin and nuts engaging the bolts, wherein the slit separating the two horns is skewed with respect to the crank-pin axis for the purpose described, and wherein the head of each bolt and the crank-web, and each nut and the crank-web, interengage with one another through the intermediary of spherical surfaces.

ALFRED HUBERT ROY FEDDEN.